Nov. 30, 1926. 1,609,045
W. P. WITHEROW
METHOD OF CUTTING DIE ROLL MATRICES
Filed Oct. 6, 1925 3 Sheets-Sheet 3

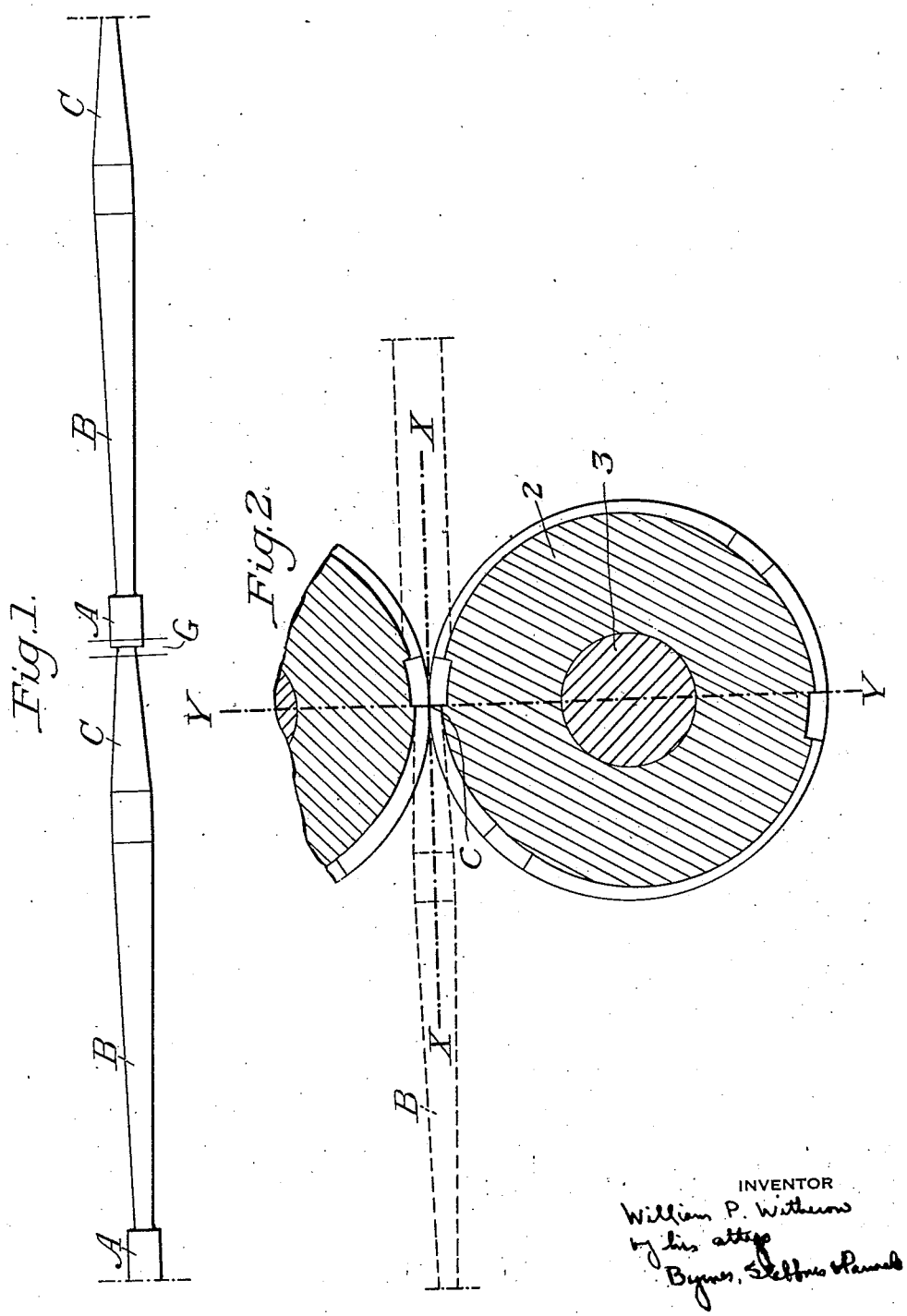

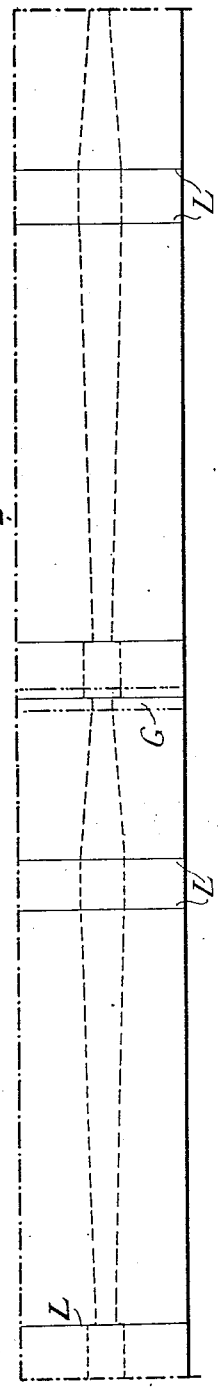
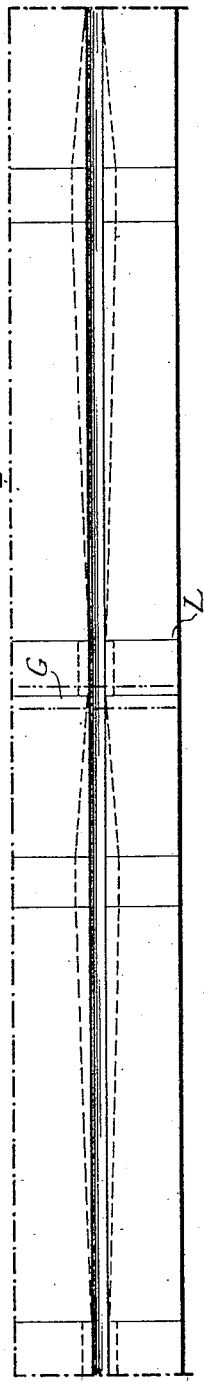
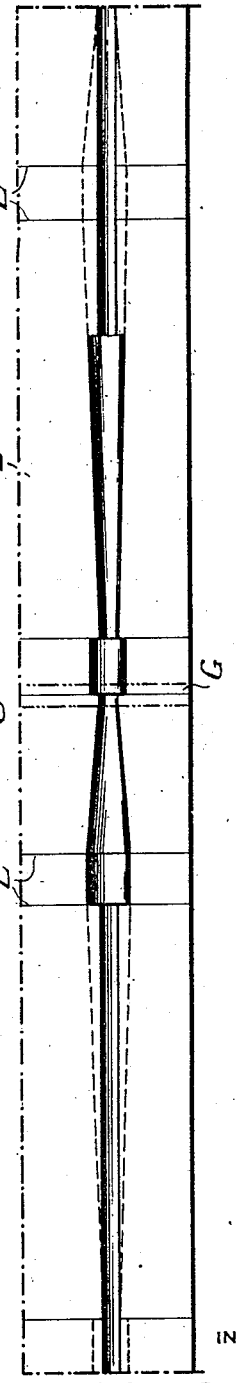

INVENTOR
William P. Witherow
by his atty
Byrnes, Stebbins & Parmelee

Patented Nov. 30, 1926.

1,609,045

UNITED STATES PATENT OFFICE.

WILLIAM P. WITHEROW, OF PITTSBURGH, PENNSYLVANIA, ASSIGNOR TO WITHEROW STEEL COMPANY, OF PITTSBURGH, PENNSYLVANIA, A CORPORATION OF PENNSYLVANIA.

METHOD OF CUTTING DIE-ROLL MATRICES.

Application filed October 6, 1925. Serial No. 60,758.

This invention relates to a method of cutting die roll matrices, and particularly to the method of cutting die rolls for the production of die rolled articles of circular cross section.

The invention is of value not only in the manufacture of new rolls, but is also valuable in the redressing of old die rolls, as described and claimed in the copending application of Paul L. Coyle, Serial No. 60,757, filed October 6, 1925.

In the die rolling of articles of varying circular cross section, some difficulty is encountered in laying out the rolls and in properly cutting the matrix portion due to the fact that the bottom of the groove is of a different length than the surface portion of the groove, and the bottom of the matrix, therefore, takes a shape which sometimes differs surprisingly from the outline which might be expected. It is not only difficult to lay out such roll contour accurately, but it is also difficult to cut the same by ordinary means. I provide for cutting the matrix portion of die rolls by rotating a cutter about an axis, occupying the same relation to the roll blank as the axis of a bar in the rolling mill will occupy with respect to the finished roll, and rotating the blank under the cutter. When it is desired to produce a roll for forming articles of varying circular cross section, the radial length of the cutter from its axis of rotation is varied as desired.

In redressing rolls it is practically impossible because of the battered condition of the roll periphery, to lay out the grooves thereon, and by the method of cutting herein disclosed the recutting of the grooves is materially simplified.

The cutter preferably occupies a position with respect to the blank corresponding to a point lying on the center line connecting the axes of the two rolls in the mill, a point which is hereinafter designated as the principal point of contact. I have found that by using such a cutter in the production of a die roll, the formation of the matrix is materially simplified, as the outline of the matrix may be marked or laid out on the periphery of the roll and it is a relatively simple matter for a mechanic to follow this outline with the cutting tool. The rotating tool automatically takes care of the body portion of the groove and forms a matrix which will produce a true circular cross section.

The radial adjustment of the cutter, which is necessary in the formation of a matrix for such articles as tapered drive shafts and other shapes having a varying circular cross section, is preferably accomplished by tapping the tool lightly with a hammer. With a little experience this can be done very accurately and the groove cut to desired dimensions.

The method can be well carried out on an ordinary milling machine, the cutter being mounted on an arbor and the roll blank being mounted between centers on the milling machine table; a dividing head or other means by which the blank can be rotated by the operator is provided. The tapping of the tool by which the radial length of the cutter is varied may be done by using a hammer on the heel of the cutting tool or on the rear end of the tool if it projects through the arbor.

I have found that highly improved results may be secured if an increasing resistance to displacement of the cutter on tapping thereof is provided. This is preferably done by very slightly tapering the body of the tool. It will be understood that the tool is held in the arbor by a set screw and it will be seen that if the tool is very slightly tapered the tapping of the cutter will be met with an increased resistance as the tool is displaced. This feature also prevents the cutter being tapped so far into the arbor that the rear end projects far enough to dig into the work.

The process is preferably carried out by laying out on the smooth roll body the contour of the matrix to be cut and then roughing out, as by lathe cutting, an initial groove corresponding to the smallest cross section. This leaves only a comparatively small amount of metal to be removed by the cutter, thus effecting a material saving in roll cost.

In the accompanying drawings, which illustrate more or less in diagram, a preferred manner of carrying out my invention—

Figure 1 is a side elevation of a blank to be produced by die rolling;

Figure 2 is a vertical section through a roll which is used in producing the article shown in Figure 1, together with a small portion of the mating roll;

Figure 3 is a developed view of the roll blank showing the matrix as laid out thereon;

Figure 4 is a similar view showing the developed roll after the initial groove has been cut;

Figure 5 is a similar view showing the roll after a portion thereof has been cut to final dimensions by my method.

Figure 6:
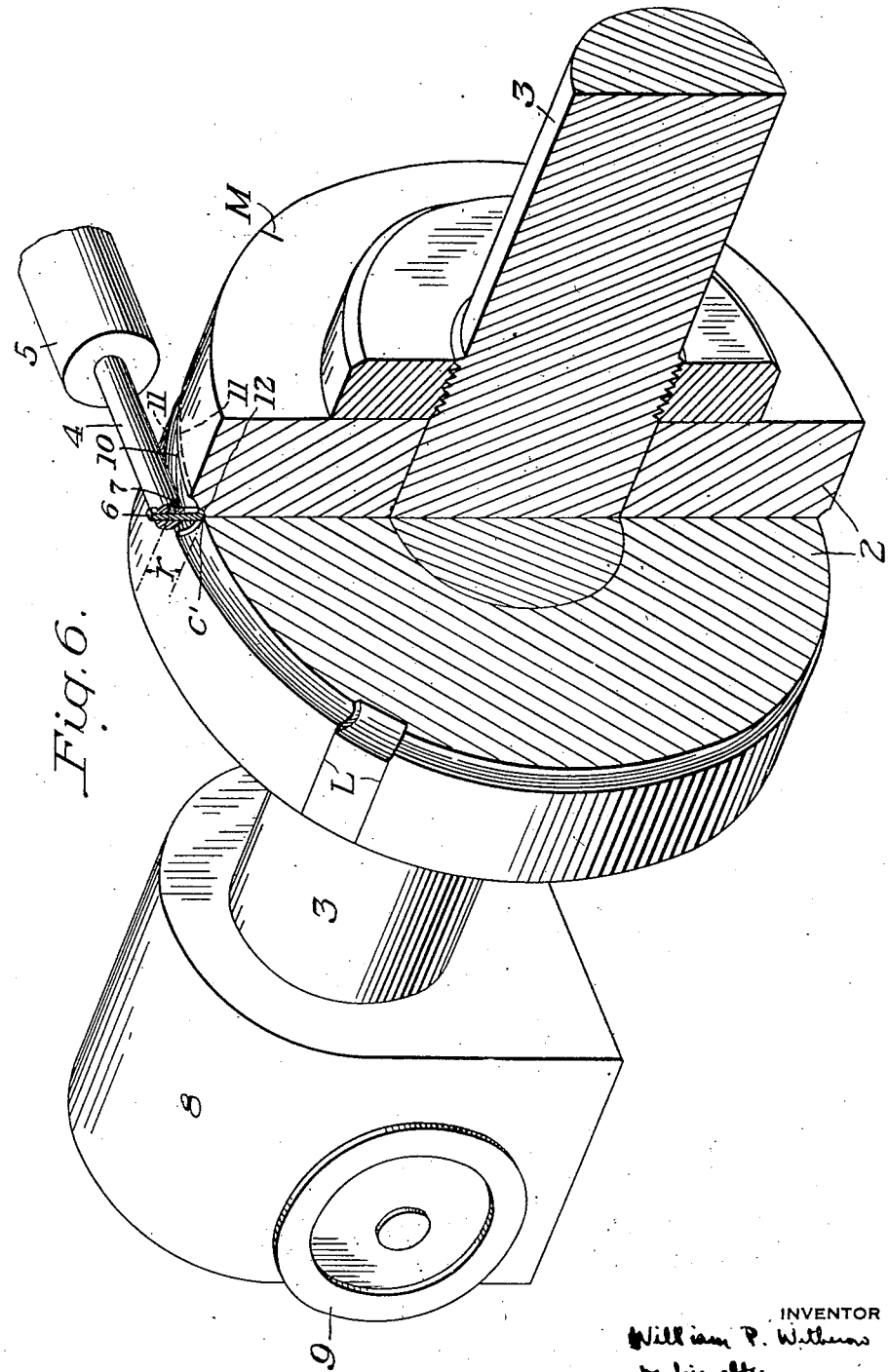
Figure 6 is a perspective view, more or less diagrammatic, illustrating the preferred manner of carrying out my invention.

In the illustrated embodiment of the invention there is shown, for purposes of illustration only, an automotive rear axle which is a fair example of a product of varying circular cross section which may be produced by die rolling.

Referring to Figure 1, it will be noted that there is a stub portion A, a long tapered body portion B and an end portion C which has a taper in the opposite direction.

Figure 2 shows a layout of a roll matrix for producing the article shown in Figure 1, and indicates in dotted line the position of the leader as it enters the mill and the string of die rolled articles as they emerge therefrom. It will be seen that the root portion of the matrix follows a line which would be decidedly difficult to cut by ordinary machine methods. In accordance with my invention a cutting tool is placed on a line of rotation corresponding to the axis X—X of the leader and rolled bar in the rolling mill proper. This cutter may be mounted on the arbor of a milling machine and its radial length will, of course, be such as to cut a matrix of the desired diameter. The cutter is preferably mounted on the arbor in such position that it lies in a line corresponding to the line Y—Y of Figure 2, which is the center line connecting the axes of the two rolls in the mill. The cutting action will then take place at a point corresponding to the point C in Figure 2 which I have designated the principal point of contact.

It will be appreciated that with a cutter so mounted it is only necessary to vary the radial length $r$ of the cutter in order to accurately produce a roll matrix which will be effective for rolling the desired article. By my method the bottom of the groove is properly shaped in accordance with the contour of the article as laid out on the periphery of the roll and very accurate results are obtained.

Referring to Figure 3, there is shown a developed periphery of the roll blank with the outline of the matrix marked thereon. This is carried out in the usual way by copper plating the surface with blue vitriol and then marking thereon the contour of the roll matrix as shown.

As described in my copending application, Serial No. 44,455, filed July 18, 1925, it is generally desirable to form a number of grooves in a single roll, so that after one pass has been worn out the next pass is immediately utilized and the rolling operation is continued. Only a portion of the roll is shown in Figure 3 and a single pass is marked out. It will be understood that in the actual roll the additional passes are marked out to correspond. This is preferably done by first scoring lines L across the periphery of the roll so that all of the various grooves will correspond. These lines are preferably deeply impressed upon the surface and they form indicia on the flash by which the length of the rolled articles may be conveniently measured. It will be noted that the axle blanks are formed with a short gate portion G which may be encroached upon in redressing as described in the aforementioned Coyle application.

Figure 4 shows the developed roll after the initial groove has been cut therein. This is preferably done on a lathe and it only remains to cut out the portions of metal lying between the solid line showing the edge of the initial groove and the dotted line indicating the final contour of the matrix.

Figure 5 is similar to Figure 4 but it shows the groove partially cut to finished size according to my method.

Figure 6 clearly shows the manner in which my method is applied to the cutting of a roll matrix. The blank 2 is mounted on an arbor 3 which is supported between centers on the table of a milling machine, not shown. An arbor 4 is placed in the head 5 of the milling machine and the arbor is provided with an opening in which is placed a cutter 6. The cutter 6 is held in place by a set screw 7. A dividing head or other spacing mechanism 8 is provided, there being a hand wheel 9 by which the operator may rotate the arbor 3 with the blank 2 thereon as desired.

It will be noted in Figure 6 that the cutter 6 lies in a vertical line extending from the axis of the arbor 3 and roll 2 so that the cutting action occurs at a point corresponding to the principal point of contact C in the mill. I have indicated this in the drawings as C'.

It follows that if the radial length of the tool is correct, a groove or matrix portion will be cut which corresponds exactly to the article to be produced. In the upper right hand portion of the drawings there is indicated the initial groove 10 which is cut on the lathe and by dotted line at 11 there is indicated the final contour of the matrix portion. It will be noted that the groove portion which is to be cut beyond the initial groove already cut is gradually increased in diameter as is shown by the divergence of the line 11 from initial groove 10. The radial length of the cutter 6 must therefore be increased as the roll 2 is rotated thereunder in order to produce the desired groove.

The radial length of the cutter is very readily increased by tapping the tool at the back end with a hammer. This can be done by the workman as the cutter rotates, and after he taps the tool he operates the hand wheel 9 so as to advance the work under the cutter. With a little experience, a competent workman can soon produce very accurate tapered grooves, or grooves of other shapes in this manner.

The tool is preferably tapered slightly with respect to the face against which the set screw 7 bears. This prevents the tool from suddenly loosening and moving too far upon an inadvertent hard blow by the hammer. Such a blow may cause digging of the tool into the work and possibly spoiling the roll. The tapered tool also provides an increasing resistance to displacement of the cutter by tapping and is of value in accurately displacing the cutter for the production of tapered matrix sections. As shown in the drawings, a section of increasing diameter is being produced, but it will be understood that a matrix portion of decreasing diameter may also be cut by this method if the point marked 12, which is the heel of the cutting end of the tool, is tapped instead of the back end. In this case, of course, the tool should be tapered slightly in the opposite direction.

When a roll is being redressed, it is first turned down and this, of course, removes the lines L from the periphery of the roll. As a guide to the roll cutter in redressing, there is preferably provided a mark M on one end of the roll which the workman may use as a starting point if he desires to lay out cross lines L on the roll after it has been turned down slightly. These marks or lines on the periphery are practically the only guides which are used when a roll is redressed according to my method because, as above stated, it is impossible to accurately lay out the contours of the grooves in the manner shown in Figure 3. Instead of this the workman adjusts the radial length of the cutting tool 6 to remove what appears to him to be a requisite amount of metal, and then by using templates at the lines L or at intermediate lines temporarily marked on the periphery of the roll for convenience, he can quickly arrive at the proper cross sectional dimensions for the recut groove.

An important advantage of my invention resides in the fact that compensation can be made for spring of the mill and the mill rolls during the cutting of the roll matrix. When a section of small diameter is being rolled the reduction is greater than if a larger section is being rolled from the same leader and there is a change in the amount of spring in the roll. If this were not compensated for it would result in the production of a bar which is slightly elliptical at certain points instead of being truly circular. This can be compensated for very readily by my method by raising or lowering the milling machine table so as to vary the distance of the cutter axis from the blank in accordance with the size of the section. This results in a slightly shallower or slightly deeper groove being cut at certain points, and as a result of this the spring of the mill is compensated for and truly circular sections are produced.

While I have illustrated one manner of carrying out my invention, it will be understood that the invention is not so limited as it may be otherwise embodied or practiced within the scope of the following claims.

I claim:

1. The method of making die rolls for articles of varying circular cross section, which includes rotating a cutter about an axis occupying substantially the same relation to the roll blank as the axis of a bar in the mill will occupy with respect to the finished roll, the cutter being capable of lateral movement with respect to its axis of rotation, causing relative rotation of the blank with respect to the axis of the cutter, and varying the radial length of the cutter by tapping the cutting tool.

2. The method of making die rolls for articles of varying circular cross section, which includes rotating a cutter about an axis occupying substantially the same relation to the roll blank as the axis of a bar in the mill will occupy with respect to the finished roll, the cutter being capable of lateral movement with respect to its axis of rotation, causing relative rotation of the blank with respect to the axis of the cutter, varying the radial length of the cutter by tapping the cutting tool, and providing an increasing resistance to the displacement of the cutter on tapping thereof.

3. The method of making die rolls for articles of varying circular cross section, which includes forming a substantially cylindrical roll blank, laying out on the periphery thereof the profile of the matrix to be cut in the roll, rotating a cutter about an axis occupying substantially the same relation to the roll blank as the axis of a bar in the mill will occupy with respect to the finished roll, causing relative rotation of the blank and the cutter axis to bring successive portions of the roll blank into cutting relation with the tool, and varying the radial length of the cutter in accordance with the profile marked on the periphery of the roll while maintaining the cutter in substantially the same axial position.

4. The method of making die rolls for articles of varying circular cross section, which includes rotating a cutter about an axis occupying substantially the same relation to the rolled blank as the axis of the bar in the mill will occupy with respect to the finished roll, maintaining the cutter in substantially the same axial position, but varying its radial length in accordance with the size of the roll matrix portion which it is desired to cut, and rotating the blank relative to the axis of the cutter.

5. The method of making die rolls for articles of varying circular cross section, which includes rotating the cutter about an axis occupying substantially the same relation to the rolled blank as the axis of the bar in the mill will occupy with respect to the finished roll, confining the cutting action to points substantially within a plane perpendicular to the cutting axis and intersecting the axis of the roll, varying the radial length of the cutter in accordance with the size of the roll matrix portion which it is desired to cut, and rotating the blank relative to the axis of the cutter.

6. The method of making die rolls for articles of varying circular cross section, which includes rotating a cutter about an axis occupying substantially the same relation to the roll blank as the axis of a bar in the mill will occupy with respect to the finished roll, the cutter being capable of lateral movement with respect to its axis of rotation, causing relative rotation of the blank with respect to the axis of the cutter, varying the radial length of the cutter by shifting it laterally so as to cut matrix portions of different size in the roll blank, and shifting the cutter axis toward and away from the axis of the blank in accordance with the size of the matrix being cut so as to compensate for varying spring of the rolls or the mill when the finished roll is employed.

In testimony whereof I have hereunto set my hand.

WILLIAM P. WITHEROW.